Aug. 3, 1971 JAMES E. WEBB 3,597,281
ADMINISTRATOR OF THE NATIONAL AERONAUTICS
AND SPACE ADMINISTRATION
RECOVERY OF RADIATION DAMAGED SOLAR
CELLS THROUGH THERMAL ANNEALING
Original Filed Oct. 21, 1966

INVENTORS
PAO-HSIEN FANG
GEORGE MESZAROS
WILLIAM G. GDULA

BY
ATTORNEYS 3,597,281

RECOVERY OF RADIATION DAMAGED SOLAR CELLS THROUGH THERMAL ANNEALING

James E. Webb, Administrator of the National Aeronautics and Space Administration, with respect to an invention of Pao-Hsien Fang, Washington, D.C., and George Meszaros and William G. Gdula, Glenn Dale, Md.
Original application Oct. 21, 1966, Ser. No. 588,634. Divided and this application May 2, 1969, Ser. No. 843,251
Int. Cl. H01v 1/00
U.S. Cl. 136—206 2 Claims

ABSTRACT OF THE DISCLOSURE

Apparatus for use onboard spacecraft to thermally anneal defects from solar cells. In one embodiment the "greenhouse effect" is employed to heat the cells to the desired annealing temperatures.

The invention described herein was made in the performance of work under a NASA contract and is subject to the provisions of section 305 of the National Aeronautics and Space Act of 1958, Public Law 85–568 (72 Stat. 435; 42 U.S.C. 2457).

This application is a division of application Ser. No. 588,634, filed Oct. 21, 1966.

This invention relates to solar cells and more particularly to a method and apparatus for recovering the efficiency of solar cells damaged by environmental radiation.

Photovoltaic or solar cells are a well-known means of generating a voltage when energized by the sun's light rays. A photovoltaic cell commonly comprises a thin sheet or wafer of a semiconductor material, such as a wafer cut from a silicon crystal, with a metallic coating on its base, constituting a terminal of the cell. On the opposite side of the cell, facing to the sunlight, there is provided an active layer or area sensitive to the sunlight which may for example be provided by diffusing boron into the surface of N-type silicon to create the well-known P-N junction where the action of the sunlight generates a voltage in a well-known manner. Ordinarily each cell of this type developes only a very small potential; but a battery can be formed from a plurality of such cells to provide desired voltage and current characteristics by connection of these cells in series or parallel arrangements.

Solar batteries are useful as D.C. voltage supplies for charging storage batteries, for operating resistive loads, or for other purposes, and are particularly useful in satellites or missiles, where the conservation of weight and space are of the utmost importance. Solar cell arrays have been used on space vehicles since the first vanguard satellite, and it appears that these electric generators will continue to be the principal power source for orbiting satellites and interplanetary probes for some time to come.

The photocell now used in solar energy converters consists of a very thin wafer of silicon which has an electron rich N-region and a hole rich P-region. In the silicon wafer, the N-type region is produced by donor impurities and, since the donor impurities in the lattice structure contribute an excess or free electron, the impurity atoms in the N-type region have a net positive charge. Conversely, acceptor impurities produce the P-type region of the wafer, and in the lattice structure required an electron to complete their valence bond with the silicon atoms. Consequently, the acceptor impurity atoms have a net negative charge. As a result of the positive charge on the donor atoms and the negative charge on the acceptor atoms, an electric field exists at the junction between the two regions which keeps electrons in the N-type region and holes in the P-type region. When light particles, such as photons, are absorbed by the silicon crystal, it gives rise to hole-electron pairs in the conduction band. The electric field existing in the wafer then forces the holes into the P-region and the electrons into the N-region thereby making the P-region positive and N-region negative. Displacement of these newly freed charges causes a voltage between the crystal ends which then supply electrical power to an external circuit.

While solar cells have found widespread use in space and other applications their operation has not proven to be entirely satisfactory. Specifically, when a solar cell is placed in a space environment and subjected to bombardment by the omnipresent high energy radiation, defects occur in the cell's crystal lattice structure. For example, defects are created when a solar cell is bombarded by high energy electrons, protons or neutrons. A defect occurs when one of the foregoing particles collides with an atom bonded in the crystal lattice structure of the solar cell. The collision displaces the atom from the crystal lattice creating a defect or vacancy therein. In some cases two adjacent atoms are displaced creating a defect known as a divacancy. These vacancies will then act as recombination centers for electrons and holes. This recombination traps the charge carriers and thereby reduces the possible current output from the solar cell. In this manner the cell's ability to generate electrical power can be deteriorated by high energy radiation.

Tests have shown that in a typical N-on-P silicon solar cell exhibiting an initial efficiency of about 11 percent, radiation bombardment can reduce the cell's efficiency by 25 percent. Such a cell, reduced to an overall efficiency of about 8 percent, is not capable of producing sufficient energy to effectively power the satellite system.

Various approaches have been attempted to alleviate the damage incurred by environmental radiation. The prior art has noted that the P-region of a solar cell is less subject to the effects of radiation than is the N-region. Specifically, a P-type semiconductor material when bombarded by radiation deteriorates less rapidly than an N-type semiconductor material. Thus, one approach has been to use an N/P solar cell as opposed to a P/N solar cell. That is, a solar cell formed of a thick P base with a thin N region diffused into it as opposed to a solar cell comprised of an N base with a diffused P region.

However, no matter which type of cell is used the light that strikes the thin region must pass through it and strike the base region. In both regions electrons or holes, as appropriate to the particular material, are generated. These electrons and holes both contribute to the current potential of the solar cell. Because undesirable radiation as well as light passes through the thin region and into the base region even the use of an N/P solar cell has not eliminated the radiation problem. That is, the radiation still creates defects in both regions.

The prior art has also attempted to solve the problem of providing shields to eliminate undesired high energy radiation. These shields may be deposited directly on the solar cell surface or they may be separately constructed and attached to the solar cell by an adhesive. However, this approach to the problem has not proven to be entirely satisfactory. In some cases the adhesive has not proven to be of sufficient strength to bond the filter to the solar cell. In other cases the coefficient of expansion of the shields, the bonding material, and the solar cell have proven to be different. Hence, when the solar cell structure has been placed in the varying temperatures of space the bonding has either broken or cracks have occurred in the filter structure. These cracks allow the undesired radiation to pass through the filter to the solar cell creating the above-discussed defects. Moreover, in some cases the use of shields has prevented desired radiation from reaching the cells thereby reducing their efficiency. In addition, the optical properties of many shields and adhesive materials have been found to change under the radiation environment of space. This change has resulted in shields which tend to reduce the passage of desired solar radiation. Finally, the use of the shields introduces additional weight to the solar panels and therefore the available power for a solar panel of an allowable weight is reduced.

Accordingly, it is an object of this invention to provide a method for recovering solar cell efficiency lost as a result of environmental radiation.

It is a further object of this invention to provide apparatus for thermal annealing of semiconductors damaged by radiation.

It is an additional object of this invention to provide apparatus for the thermal annealing of damaged solar cells which apparatus is self-contained wtih a spacecraft and may be utilized while the craft is functioning in its operative environment.

These and other objects and features of the invention will be more clearly understood from the following description taken in conjunction with the drawings in which.

Figure 1:
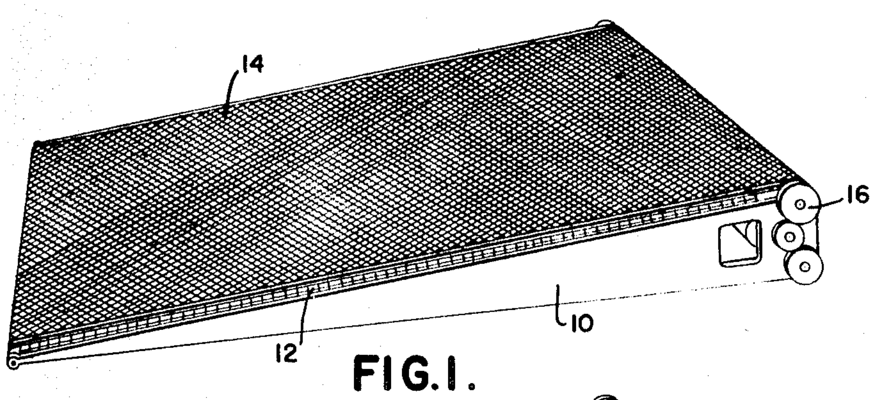
FIG. 1 is a perspective view of a solar array utilizing the apparatus of this invention.

In accordance with this invention, it has been discovered that silicon solar cells damaged by radiation can be completely recovered an indefinite number of times by subjecting such cells to high temperatures for a period of time. Additionally, the invention further comprises apparatus for generating the necessary heat while the cells are operationally deployed on a functioning spacecraft.

Although a considerable amount of knowledge has been accumulated on the annealing of defects in metals, understanding of such defects in semiconductors is much less complete. At very low temperatures (in the liquid helium tempearture region) the primary defects for both metals and semiconductors are interstitials and vacancies. A basic difference between the defects in metals and semiconductors occurs at higher temperatures (liquid nitrogen temperature and above). While interstitials and vacancies remain as stable defects in metals, in semiconductors these defects are no longer stable and can be readily annealed. Defects in semiconductors which are stable at high temperatures are complex; they consist of associations between interstitials and vacancies among themselves or with impurities.

It has been discovered, however, that even without knowing the specific defect structure, radiation damage below a certain maximum level may be annealed completely in semiconductors by heating to about 400° C. such thermal annealing, if carried out before the maximum damage level is reached, will completely restore photovoltaic units to their original efficiency. Although annealing temperatures may be affected by shifts in the concentration of defect centers and impurities, and by previous thermal history (in the conventional industrial practice solar cells must undergo a treatment near 1000° C. to form an N-P junction by diffusion) it has been found that generally a temperature in the range of 350 to 420° C. held for a period of time is sufficient to anneal silicon defects.

More specifically, N/P silicon solar cells having a base resistivity of 10 ohm-cm. and an initial efficiency of about 11 percent were irradiated with $4 \times 10^{14}$ electrons/cm.$^2$ of 1 mev. energy. The overall efficiency of the cells after electron bombardment was reduced approximately 25 percent. For annealing, forming gas is introduced into a high temperature oven which is heated to 400° C. The irradiated cells, resting in a platinum boat within a quartz tube, were then inserted into the oven for a period of 15 minutes. The resultant cells demonstrated a complete quantum yield recovery and, in fact, exhibited a slight improvement in the total yield compared to the original efficiencies of the specimens.

The above method produces quite satisfactory results in laboratory applications where the required annealing temperatures are readily attained. However, serious problems arise in applying this method to solar arrays employed in aerospace applications where, of course, the cells cannot be returned for furnace annealing and where radiation damage continues to accumulate as the cells are exposed to their environment.

Figures 2, 3:
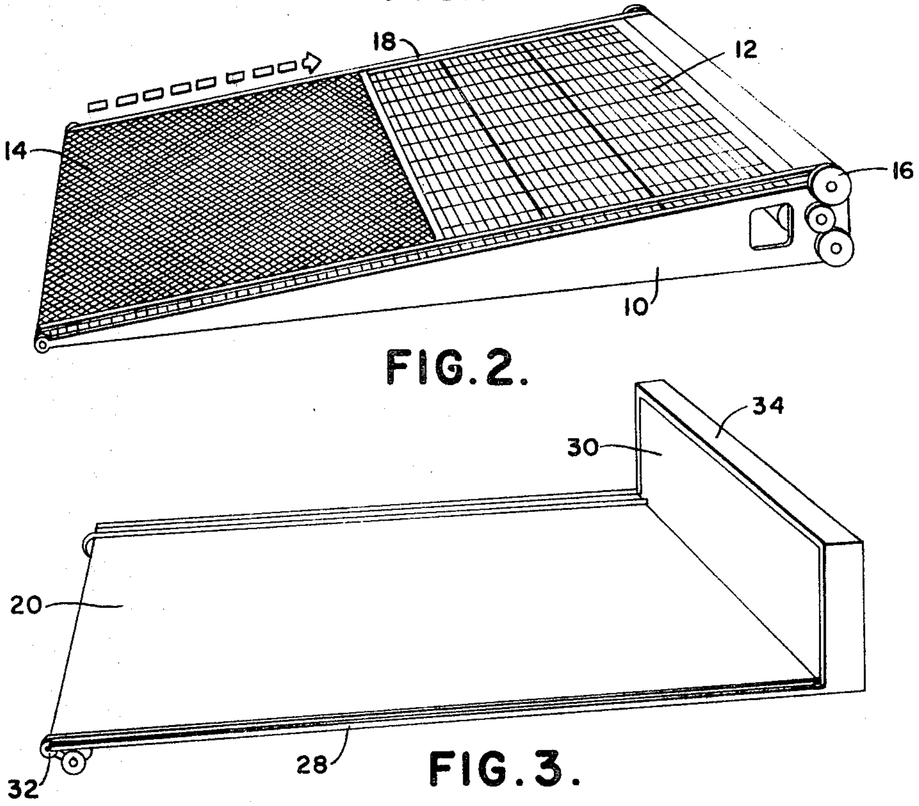
FIG. 2 is a perspective view of the array shown in FIG. 1 with the annealing apparatus being deployed toward its operative position.
FIG. 3 is a perspective view of an alternate embodiment of the invention shown during the annealing process.

Referring now to FIGS. 1 and 2 apparatus is disclosed for periodically annealing cell arrays while such arrays remain in their operative orientation within the space environment. Housing 10 forms a support for solar array 12 which is composed, for example, of many electrically interconnected silicon solar cells. The housing 10 may be a solar paddle operational deployed on a satellite or could, as a solar panel, form part of the external skin of the spacecraft.

After continued exposure to bombardment of electrons, neutrons, and/or protons the total yield of the array 12 will be markedly reduced. In order to recover this lost yield through the thermal annealing process discussed above a cell temperature of approximately 400° C. must be attained. Assuming a block body radiation heat loss into 0° K. surroundings, the necessary heat to maintain a 400° C. temperature is about 400 watt/ft.$^2$ of a solar panel, which is approximately 10 watts per solar cell of 2 cm.$^2$ area. This is to be compared with a power output of about 0.02 watt/2 cm.$^2$ from a conventional solar cell.

The apparatus of FIGS. 1 and 2 utilizes the "greenhouse effect" to achieve the required heating. During the annealing as shown in FIG. 1 a window 14 is moved into position over the array. The window material is a flexible film which is resistant to high temperature and space radiation and is stable in vacuum. The film is transparent to the visible and ultarviolet portion of the solar spectrum but is opaque to the infrared. An example of a high temperature resistant film is "H-film," a polyimid material produced by the Du Pont Chemical Company, Wilmington, Del. The transmission and reflection properties of this particular film are improved for the purposes of this invention through the use of an optical coating. Such a coating enhances transmission in the short wave light region but is opaque to long wave light. Optical coatings of this type are well-known and can be applied by conventional methods.

The window 14 in its inactive position is stored behind the array 12. When it is desired to anneal the cells, a motor (not shown) which may be controlled from the ground or programmed for control within the craft itself is activated to position the window through gear drive 16 and feed bands 18. Brushless D.C. motors such as described in NASA Technical Notes TN D–2108, February 1964, and TN D–2819, May 1965, are particularly suited for this purpose. FIG. 2 depicts the window partially deployed.

When the window 14 is activated to position between the sunlight and the solar cells the film material, through the "greenhouse effect," allows transmission of short wave light while prohibiting the escape of long wave light which is absorbed as heat by the solar cells. Thus the array is brought to annealing temperature. Under actual conditions this operation should take approximately one hour and can be repeated as often as necessary to maximize total quantum yield from the solar array.

One limitation upon use of the "greenhouse effect" is that the solar array must face the sun steadily during the annealing period. Although the actual annealing period will be on the order of 10 to 15 minutes, considerably more time is required to raise the temperature of the entire array.

Figure 4:
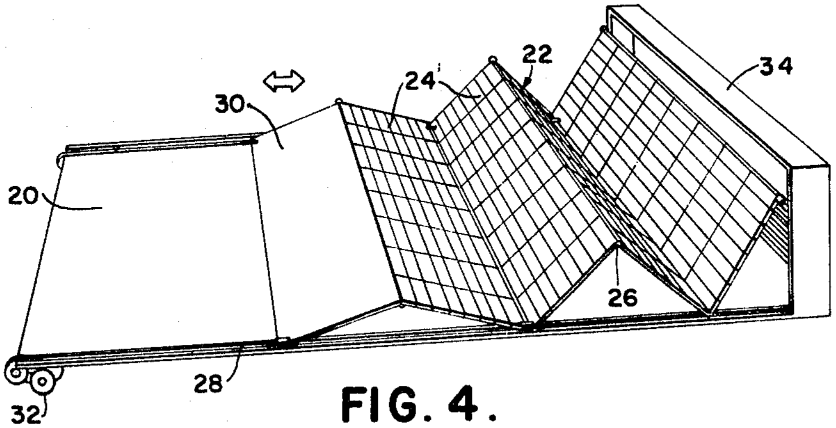
FIG. 4 is a perspective view of the embodiment of FIG. 3 showing the solar cell array being deployed.

An alternate embodiment of this invention which requires no particular attitude orientation of the spacecraft is depicted in FIGS. 3 and 4. This approach provides a supplementary heating system to develop the necessary annealing temperature. In this embodiment a frame 20 supports the solar array 22. The array is composed of individual panels 24 of solar cells. These panels are hinged together as at 26 and are drawn by feed bands 28 attached to front panel 30. The feed bands 28 are driven through gearing 32 by a suitable motor (not shown). An alternate means which could be used for mounting the individual cells is disclosed in application, Ser. No. 344,793, filed Feb. 13, 1964, for Interconnection of Solar Cells.

When the array 22 is to be annealed the motor is activated and feed bands 28 draw the hinged panels 24 into canister 34 where the front panel 30 serves as a cover member as shown in FIG. 3. The canister 34 serves as an electric heating oven during the annealing period. Heating coils (not shown) are contained within the canister to generate the required energy. In order to reduce heat loss by radiation the exterior canister surfaces are covered with a highly reflective metallic coating.

This approach serves to concentrate the annealing energy and greatly reduce the total time necessary to perform the operation. Additionally, it avoids the necessity of maintaining the array in a constant orientation during annealing.

Utilizing the processes above described damage due to electron irradiation can be annealed independently of electron energy up to 55 mev. and quite probably as high as several hundred mev. At very high energies, a apallation process could occur which would produce large clusters of defects which could prove difficult to anneal. However, in the space environment concentration of electrons of very high energy is not significant. For more populous low energy electrons there is no presently foreseen upper limit to potential total flux, provided intermediate annealing is carried out before the threshold damage level is reached. In the case of proton radiation damage, annealing does not attain the same degree of completeness as in electron irradiation, however, thin glass covers have proved adequate protection for the most severe cases of low energy proton irradiation (0.1 to 0.5 mev.).

Various other modifications are contemplated and may obviously be resorted to by those skilled in the art without departing from the spirit and scope of this invention as hereinafter defined by the appended claims. For example, it is possible that in lieu of the heating system described in conjunction with FIGS. 3 and 4, ohmic heat for annealing could be obtained directly from the solar cells by injecting a large current either through the grid and base connectors of the cells in a forward direction or from one edge to the opposite edge of the cells base electrodes. In this case, due to power limitation only few solar cells would be heated at one time, and a scanning system would be provided to heat all solar arrays consecutively until an entire array or panel had been annealed.

What is claimed is:

1. Apparatus for annealing defects in solar cells damaged by radiation bombardment comprising:

a plurality of solar cells electrically interconnected to form a solar cell array, a window moveably mounted adjacent said array, said window comprising a film material which is relatively transparent to short wave light and relatively opaque to long wave light, and means to selectively move said window into position between said array and incident sunlight, whereby the incident sunlight passing through said window is converted to heat which is absorbed by the solar cells to anneal defects created by radiation bombardment and thereby recover efficiency lost as a result of such bombardment.

2. Apparatus for annealing defects in solar cells damaged by radiation bombardment comprising:

flexible support means, a plurality of solar cells electrically interconnected and mounted on said support means, a container adjacent said support means;

a heat source within said container, said heat source being capable of maintaining for selected periods of time a temperature in the range of 350° C. to 420° C., and means for selectively drawing said support means into and out of said container, whereby radiation damage to said solar cells may be repeated annealed by thermal treatment within said container.

References Cited

Gianola, U.F. Damage to Silicon Produced by Bombardment with Helium Ions, in "Journal of Applied Physics," vol. 28, No. 8, August 1957, pp. 868–873.

Pfann et al., Radioactive and Photelectric p-n Junction Power Sources, in "Journal of Applied Physics," vol. 25, No. 11, November 1954, pp. 1222–1234.

BENJAMIN R. PADGETT, Primary Examiner

H. E. BEHREND, Assistant Examiner

U.S. Cl. X.R.

126—270; 136—89